United States Patent
Zhou et al.

(10) Patent No.: US 11,310,434 B2
(45) Date of Patent: Apr. 19, 2022

(54) IMAGE SENSOR FOR CAMERA MODULE OF ELECTRONIC DEVICE HAVING A PIXEL ARRAY WITH AN IMAGING AREA AND A LIGHT SENSING AREA

(71) Applicant: Guangdong Oppo Mobile Telecommunications Corp., Ltd., Guangdong (CN)

(72) Inventors: Yibao Zhou, Guangdong (CN); Jiao Cheng, Guangdong (CN); Haiping Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 169 days.

(21) Appl. No.: 16/603,766

(22) PCT Filed: Apr. 13, 2018

(86) PCT No.: PCT/CN2018/083046
§ 371 (c)(1),
(2) Date: Oct. 8, 2019

(87) PCT Pub. No.: WO2018/201876
PCT Pub. Date: Nov. 8, 2018

(65) Prior Publication Data
US 2021/0099629 A1 Apr. 1, 2021

(30) Foreign Application Priority Data
May 3, 2017 (CN) .......................... 201710305890.0

(51) Int. Cl.
H04N 5/335 (2011.01)
H04N 5/235 (2006.01)
(Continued)

(52) U.S. Cl.
CPC ........ *H04N 5/2351* (2013.01); *H04M 1/0264* (2013.01); *H04N 5/2257* (2013.01); *H04N 5/247* (2013.01); *H04N 9/0455* (2018.08)

(58) Field of Classification Search
CPC .................................................... H04N 5/2351
See application file for complete search history.

(56) References Cited

U.S. PATENT DOCUMENTS

2008/0316330 A1  12/2008  Egawa
2012/0176533 A1*  7/2012  Cellier ................. H04N 5/2351
                                           348/362
(Continued)

FOREIGN PATENT DOCUMENTS

CN  101535890 A  9/2009
CN  102595030 A  7/2012
(Continued)

OTHER PUBLICATIONS

India Office Action for IN Application 201917042829 dated Jan. 29, 2021. (6 pages).
(Continued)

*Primary Examiner* — Gary C Vieaux
(74) *Attorney, Agent, or Firm* — Young Basile Hanlon & MacFarlane, P.C.

(57) ABSTRACT

An image sensor, a camera module, and an electronic device are provided. The image sensor includes a pixel array and a control circuit. The pixel array includes a light sensing area and an imaging area. The light sensing area is configured to detect an illumination intensity, and the imaging area is configured to acquire an image. The control circuit is configured to receive a first instruction to control the light sensing area to detect an illumination intensity, and to receive a second instruction to control the imaging area to acquire an image.

12 Claims, 7 Drawing Sheets

(51) Int. Cl.
    *H04N 9/04* (2006.01)
    *H04M 1/02* (2006.01)
    *H04N 5/225* (2006.01)
    *H04N 5/247* (2006.01)

(56) References Cited

U.S. PATENT DOCUMENTS

| | | |
|---|---|---|
| 2013/0187027 A1 | 7/2013 | Qiao et al. |
| 2014/0168372 A1* | 6/2014 | Chang .................. G01S 17/86 |
| | | 348/46 |
| 2015/0264278 A1* | 9/2015 | Kleekajai ............ H04N 5/2351 |
| | | 348/227.1 |
| 2016/0037070 A1* | 2/2016 | Mandelli ................ H04N 5/369 |
| | | 348/322 |

FOREIGN PATENT DOCUMENTS

| | | | |
|---|---|---|---|
| CN | 202798942 U | * | 3/2013 |
| CN | 202798942 U | | 3/2013 |
| CN | 103973945 A | | 8/2014 |
| CN | 104486987 A | | 4/2015 |
| CN | 104519327 A | | 4/2015 |
| CN | 107222591 A | | 9/2017 |
| CN | 107249109 A | | 10/2017 |
| CN | 107426470 A | | 12/2017 |
| CN | 107426471 A | | 12/2017 |
| EP | 1133168 A2 | | 9/2001 |
| EP | 2472853 A1 | | 7/2012 |

OTHER PUBLICATIONS

European Examination Report for EP Application 18793991.3 dated Feb. 9, 2021. (4 pages).
English translation of OA for CN application 201710305890.0 dated Apr. 29, 2020.
Extended Search Report for EP application 18793991.3 dated Feb. 21, 2020.
ISR with English translation for PCT application PCT/CN2018/083046 dated Nov. 8, 2018.
OA with English translation for CN application 201710305890.0 dated Mar. 5, 2019.

* cited by examiner

IMAGE SENSOR FOR CAMERA MODULE OF ELECTRONIC DEVICE HAVING A PIXEL ARRAY WITH AN IMAGING AREA AND A LIGHT SENSING AREA

CROSS-REFERENCE TO RELATED APPLICATION(S)

This application is a 371 application of International Application No. PCT/CN2018/083046, filed on Apr. 13, 2018, which claims priority to Chinese Patent Application Serial No. 201710305890.0, filed on May 3, 2017 the entire contents of all of which are incorporated by reference in their entireties.

TECHNICAL FIELD

The present disclosure relates to a technical field of electronic devices, and more particularly, to an image sensor, a camera module and an electronic device.

BACKGROUND

A front camera usually may be arranged in a mobile phone for taking a selfie, and a light sensor may also be arranged so as to adjust a display brightness of a display screen of the mobile phone according to an ambient-light brightness. However, a large space will be occupied by the front camera and the light sensor which are arranged at the same time, thus resulting in a small proportion of space available for arranging the display screen in the mobile phone, and hence causing a low screen-to-body ratio of the mobile phone.

SUMMARY

Embodiments of the present disclosure provide an image sensor, a camera module and an electronic device.

The image sensor according to embodiments of the present disclosure includes a pixel array and a control circuit. The pixel array includes a light sensing area and an imaging area. The light sensing area is configured to detect an illumination intensity and the imaging area is configured to acquire an image. The control circuit is configured to receive a first instruction to control the light sensing area to detect the illumination intensity, and to receive a second instruction to control the imaging area to acquire the image.

The camera module according to embodiments of the present disclosure includes an image sensor and an optical filter. The image sensor includes a pixel array and a control circuit. The pixel array includes a light sensing area configured to detect an illumination intensity and an imaging area configured to acquire an image. The control circuit is connected to the pixel array and configured to control the light sensing area to detect the illumination intensity according to a first instruction, and to control the imaging area to acquire the image according to a second instruction. The optical filter is arranged opposite to the imaging area, and configured to be passed through by light to allow the light to reach the imaging area.

The electronic device according to embodiments of the present disclosure includes a camera module and a processor. The camera module includes an image sensor and an optical filter. The image sensor includes a pixel array and a control circuit. The pixel array includes a light sensing area configured to detect an illumination intensity and an imaging area configured to acquire an image. The control circuit is connected to the pixel array and configured to control the light sensing area to detect the illumination intensity according to a first instruction, and to control the imaging area to acquire the image according to a second instruction. The optical filter is arranged opposite to the imaging area, and configured to be passed through by light to allow the light to reach the imaging area. The processor is connected to the control circuit and configured to generate the first instruction and the second instruction.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and/or other additional aspects and advantages of embodiments of the present disclosure will become apparent and readily appreciated from the following descriptions made with reference to the drawings.

DETAILED DESCRIPTION

Embodiments of the present disclosure are further described with reference to the accompanying drawings. Same or similar reference signs represent the same or similar components or components that have the same or similar functions from beginning to end.

Moreover, the embodiments described below with reference to the accompanying drawings are examples, are merely used to explain the present disclosure, and cannot be construed as a limitation to the present disclosure.

In the descriptions of the present disclosure, it should be noted that, unless otherwise expressly specified and limited, the first feature "on" or "under" the second feature may be that the first and second features are in direct contact, or that the first and second features are in indirect contact through an intermediate medium. Moreover, the first feature "up", "above" and "on" the second feature may be that the first feature is directly above or obliquely above the second feature, or merely be that the first feature has a level higher than the second feature. The first feature "down", "below" and "under" the second feature may be that the first feature is directly below or obliquely below the second feature, or merely be that the first feature has a level less than the second feature.

Figure 1:
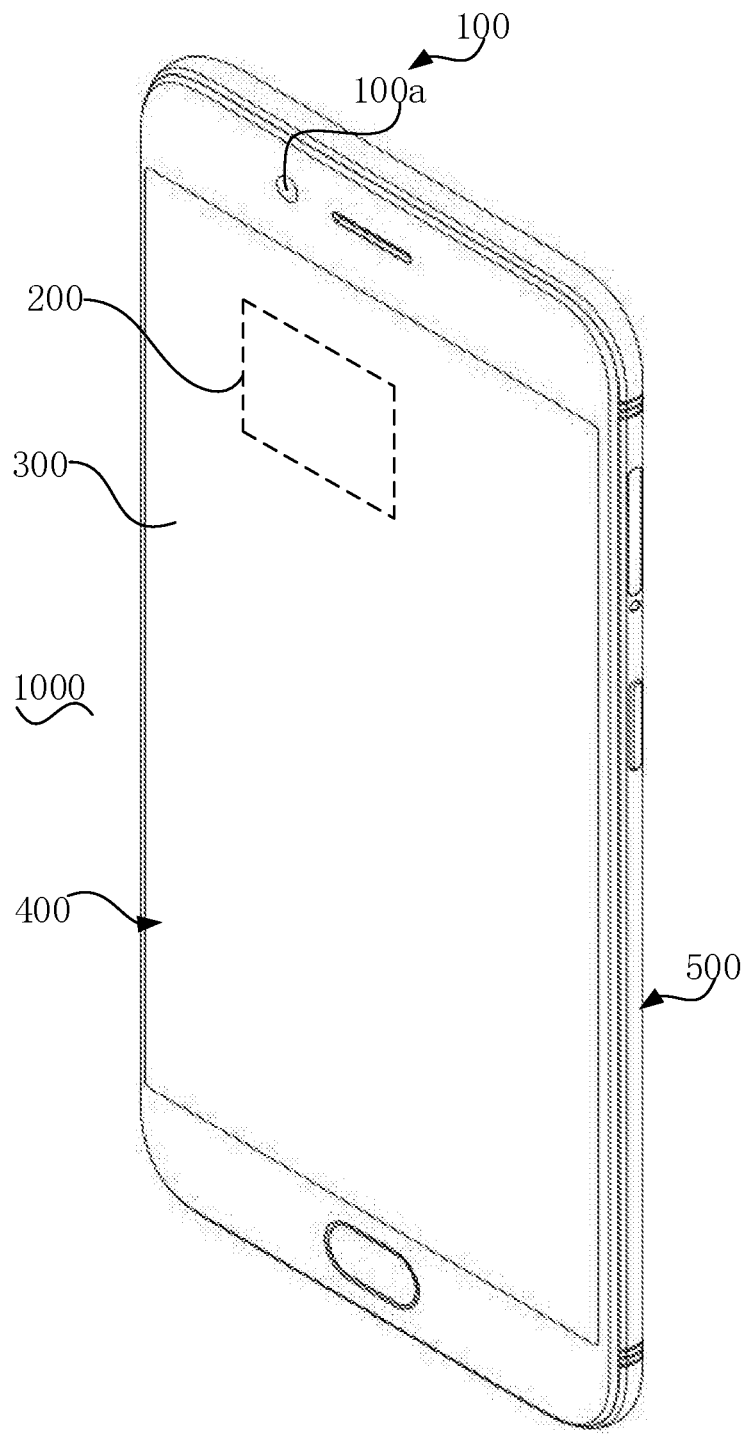
FIG. 1 is a perspective view of an electronic device according to an embodiment of the present disclosure.
Figure 2:
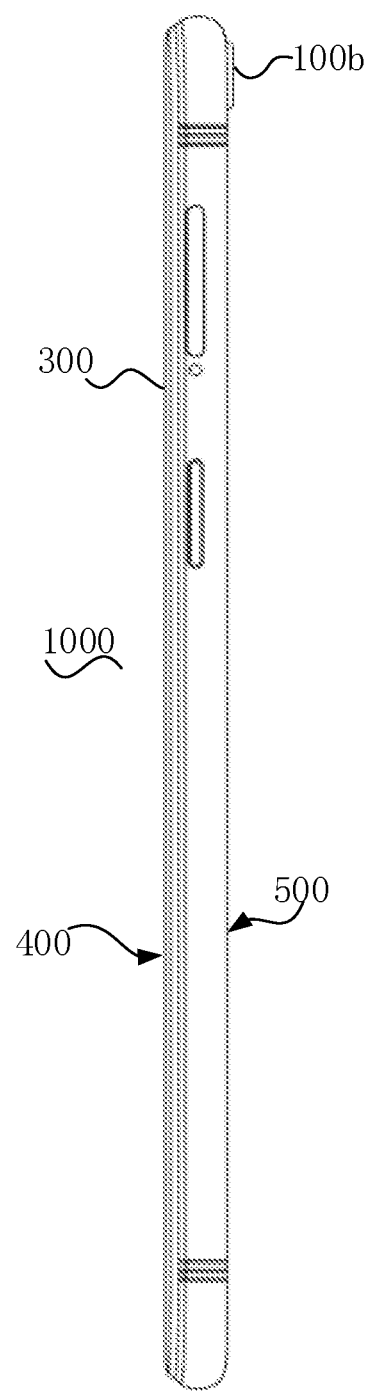
FIG. 2 is a side view of an electronic device according to an embodiment of the present disclosure.
Figure 3:
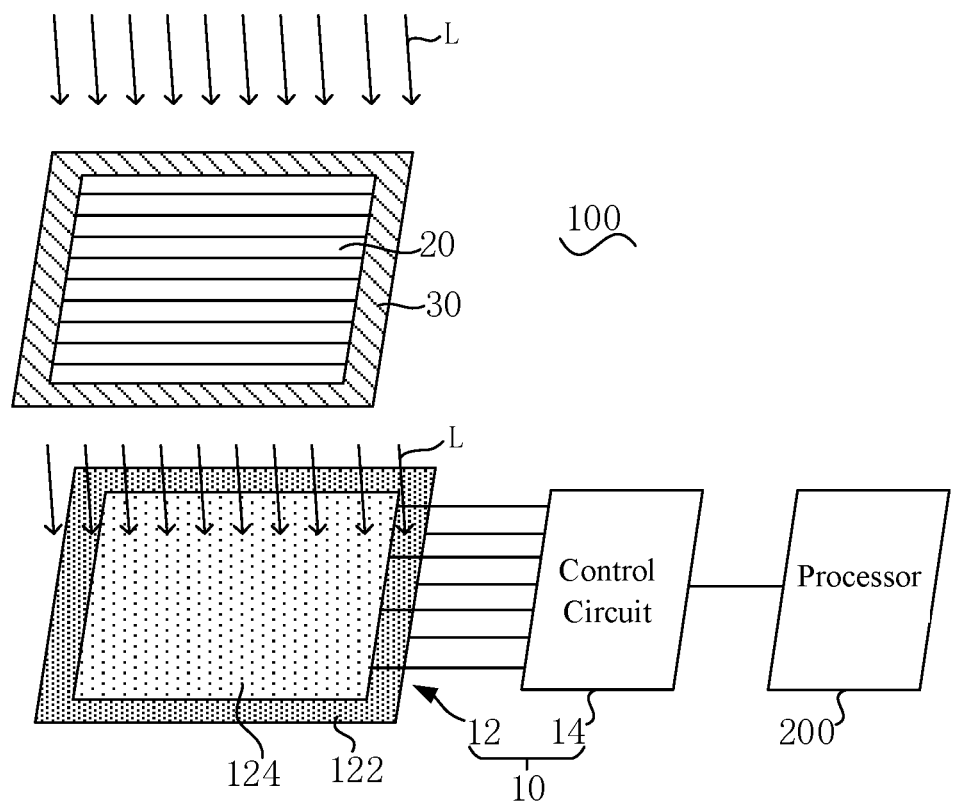
FIG. 3 is a schematic view of a camera module according to an embodiment of the present disclosure.

As illustrated in FIGS. 1-3, an image sensor 10 according to an embodiment of the present disclosure includes a pixel array 12 and a control circuit 14. The pixel array 12 includes a light sensing area 122 and an imaging area 124. The light sensing area 122 is used to detect an illumination intensity, and an imaging area 124 is used to acquire an image. The control circuit 14 is configured to receive a first instruction to control the light sensing area 122 to detect the illumination intensity, and also configured to receive a second instruction to control the imaging area 124 to acquire the image. The control circuit 14 can receive the first instruction and the second instruction at the same time.

The image sensor 10 according to an embodiment of the present disclosure may be applied to a camera module 100 according to an embodiment of the present disclosure. The camera module 100 includes an image sensor 10 and an optical filter 20. The optical filter 20 is arranged opposite to the imaging area 124, and light L reaches the imaging area 124 after passing through the optical filter 20.

The camera module 100 according to an embodiment of the present disclosure may be applied to the electronic device 1000 according to an embodiment of the present disclosure, and the electronic device 1000 includes the camera module 100 and a processor 200. The processor 200 is connected to the control circuit 14, and is configured to generate the first instruction and the second instruction. In some embodiments, the electronic device 1000 also includes a display screen 300 for displaying data information such as videos, images, texts, icons, etc.

In the image sensor 10, the camera module 100 and the electronic device 1000 described above, the control circuit 14 can achieve functions of detecting the illumination intensity and acquiring the image by controlling one pixel array 12, so as to avoid providing one camera element and one light sensing element at the same time and hence to reduce the number of components. Thus, a proportion of space for arranging the display screen 300 therein is increased, and a screen-to-body ratio of the electronic device 1000 is improved.

In some embodiments, the optical filter 20 may be a RBG optical filter arranged opposite to the imaging area 124. The RGB optical filter may be arranged in a Bayer array so that the light L passes through the optical filter 20 to obtain a color image by the imaging area 124. Furthermore, in some embodiments, the camera module 100 also includes a visible light filter 30, and the visible light filter 30 is arranged opposite to the light sensing area 122. The light L reaches the light sensing area 122 after passing through the visible light filter 30. Thus, after the light L passes through the visible light filter 30, a visible part of the light L reaches the light sensing area 122. The light sensing area 122 may be configured to detect the illumination intensity of the visible light, thereby avoiding an interference of the invisible light, such as infrared light and ultraviolet light of the light L.

In some embodiments, a position relationship between the optical filter 20 and the visible light filter 30 is same with a position relationship between the imaging area 124 and the light sensing area 122. Further, the optical filter 20 has a same shape as the imaging area 124, and the visible light filter 30 has a same shape as the sensing area 122. Thus, the imaging effect and the detection accuracy of the image sensor 10 can be ensured.

In some embodiments, the electronic device 1000 includes a single camera module 100, and the single camera module 100 is a front camera module 100a. The front camera module 100a and the display screen 300 are arranged to a front face 400 of the electronic device 1000. The front camera module 100a may be configured to detect an illumination intensity on the front face 400 and obtain an image opposite to the front face 400 at the same time.

As illustrated again in FIG. 3, in some embodiments, the electronic device 1000 includes two camera modules 100, and the two camera modules 100 are configured as a front camera module 100a and a rear camera module 100b, respectively. The front camera module 100a and the display screen 300 are arranged to a front face 400 of the electronic device 1000, while the rear camera module 100b is arranged to a back face 500 of the electronic device 1000. The back face 500 faces away from the front face 400. The front camera module 100a may be configured to detect an illumination intensity on the front face 400 to obtain a front-face illumination intensity and also configured to obtain an image opposite to the front face 400 at the same time. The rear camera module 100b may be configured to detect an illumination intensity on the back face 500 to obtain a back-face illumination intensity and also configured to obtain an image opposite to the back face 500 at the same time.

Thus, in the process of using the electronic device 1000, the processor 200 is also used to select a larger one from the front-face illumination intensity detected by the front camera module 100a and the back-face illumination intensity detected by the rear camera module 100b as a final illumination intensity. Taking the electronic device 1000 which is a mobile phone as an example, a large difference may exist between the illumination intensities on the front face 400 and the back face 500 of the electronic device 1000 when a user uses the electronic device 1000. For example, the user may place the mobile phone whose front face faces downwards on a desktop. If the display brightness of the display screen 300 is controlled only according to the front-face illumination intensity detected by the front camera module 100a, the display screen 300 may be in a non-display state or in a state with a very low display brightness. When the user suddenly picks up the electronic device 1000 and uses it again, the electronic device 1000 needs to rewake up the display screen 300 or turn the brightness of the display screen 300 up in a short time. When the user frequently picks it up and drops it down, the electronic device 1000 consumes much electric energy to control the switching operation of the brightness of the display screen 300. The electronic device 1000 according to the embodiment of the present disclosure can also detect the back-face illumination intensity of the electronic device 1000. When the user places the mobile phone whose front face faces downwards on the desktop, the display screen 300 can display with the brightness corresponding to the back-face illumination intensity within a certain time range, and when the user re-picks up the electronic device 1000 and uses it, the display brightness of the display screen 300 does not need to switch, which facilitates the usage and saves the electric energy.

In another embodiment, the electronic device 1000 may control the display brightness of the display screen 300 according to the larger one between the front-face illumination intensity and the back-face illumination intensity. For example, when the user lies down indoors and operates the electronic device 1000, the back face 500 may face towards a ceiling light source (such as a chandelier), such that the back-face illumination intensity is larger than the front-face illumination intensity. In this case, the electronic device 1000 can adjust the display brightness of the display screen 300 according to the back-face illumination intensity, which facilitates the user to see the displayed content clearly and relieve the eye fatigue.

The electronic device 1000 may be a mobile phone, a tablet computer or a smart watch. The electronic device 1000 according to the embodiment of the present disclosure is described by taking the mobile phone as an example. The illumination intensity acquired by the image sensor 10 may be used as a basis for adjusting the display brightness of the display screen 300 of the electronic device 1000. For example, when the illumination intensity is high, the display brightness of the display screen 300 is increased, or when the illumination intensity changes from a large value to a value that is less than a certain threshold, it is determined that the user is answering a phone and thus the display screen 300 is turned off. The image acquired by the image sensor 10 may be displayed in the display screen 300 or be stored in the storage medium of the electronic device 1000 to be read or dumped.

The processor 200 is configured to generate the first instruction and the second instruction. In addition, the processor 200 sends the first instruction and the second instruction to the control circuit 14. In some embodiments, the processor 200 can generate and send the first instruction separately, or generate and send the second instruction separately, or generate and send the first instruction and the second instruction at the same time. The first instruction and the second instruction may be generated when the processor 200 receives an input operation, and the input operation may be an operation input by the user or an input of an application environment. For example, in the mobile phone according to an embodiment of the present disclosure, the first instruction and the second instruction may be generated by the processor after the processor receives an operation of touching or pressing a specified function key of the mobile phone by the user. The first instruction and the second instruction may also be generated by the processor 200 when the system time of the mobile phone reaches a predetermined time point.

The control circuit 14 may receive both the first instruction and the second instruction at the same time. That is, the control circuit 14 may control the light sensing area 122 to detect the illumination intensity and control the imaging area 124 to obtain an image at the same time. Of course, the control circuit 14 may receive the first instruction separately to control the light sensing area 122 to detect the illumination intensity, or receive the second instruction separately to control the imaging area 124 to acquire the image. When the control circuit 14 does not receive the first instruction or the second instruction, both the light sensing area 122 and the imaging area 124 are in a standby state. In some embodiments, the pixel array 12 includes a plurality of pixels arranged in an array. The pixels located in the light sensing area 122 are configured to detect the illumination intensity, and the pixels located in the imaging area 124 are configured to obtain the image. Each pixel can generate a corresponding electric quantity according to the illumination intensity of the light arriving at the pixel.

The control circuit 14 is electrically connected to each pixel. The control circuit 14 obtains the electric quantity generated by the corresponding pixel according to the received first or second instruction, and further obtains the illumination intensity of the light arriving at the pixel through analyzing the value of the electric quantity by the processor 200, or further obtains the image through comprehensively analyzing the illumination intensity of the light arriving at multiple pixels by the processor 200.

In some embodiments, a ratio of an area of the imaging area 124 to an area of the pixel array 12 is greater than or equal to 0.6, and/or a ratio of an area of the light sensing area 122 to an area of the pixel array 12 is greater than or equal to 0.1. In some embodiments, the ratio of the area of the imaging area 124 to the area of the pixel array 12 may be 0.6, 0.7, 0.77, 0.8, 0.9, etc. The ratio of the area of the light sensing area 122 to the area of the pixel array 12 may be 0.1, 0.2, 0.22, 0.4, etc. In this way, on the basis of ensuring the image sensor 10 to have a function of detecting the illumination intensity, the image sensor 10 also has a good imagining effect.

Figure 4:
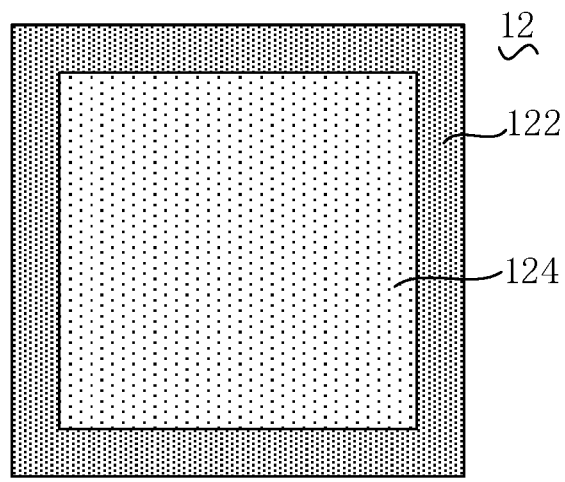
FIG. 4 is a plan view of a pixel array according to an embodiment of the present disclosure.
Figure 5:
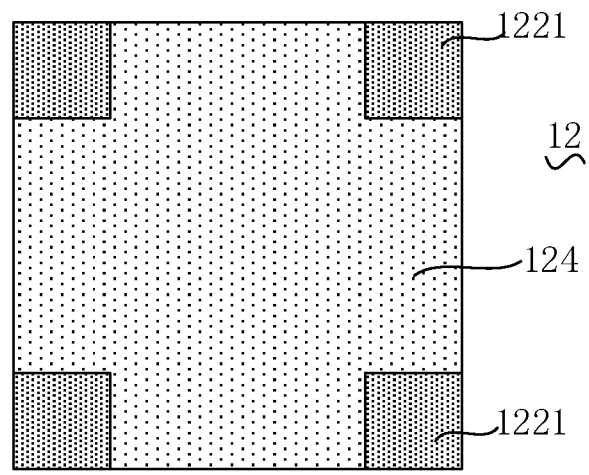
FIG. 5 is a plan view of a pixel array according to an embodiment of the present disclosure.

As illustrated in FIG. 4 and FIG. 5, in some embodiments, the imaging area 124 is continuously distributed and located in a center of the pixel array 12, and the light sensing area 122 is located at a periphery of the imaging area 124. Thus, the continuous distribution of the imaging area 124 facilitates generation of a continuous and complete image. In some embodiments, a center of the imaging area 124 may coincide with the center of the pixel array 12. The imaging area 124 may be centrally symmetrical, and the light sensing area 122 may be located on one or more sides of the imaging area 124.

In some embodiments, the light sensing area 122 includes a plurality of sub light sensing areas 1221, and the plurality of sub light sensing areas 1221 have equal areas and are spaced apart from one another.

It should be understood that the final illumination intensity detected by the light sensing area 122 needs to obtained with comprehensively considering the illumination intensities detected by all the pixels in the light sensing area 122. Therefore, in order to obtain an objective environment illumination intensity, the light sensing area 122 should be arranged as dispersive as possible. That is, the light sensing area 122 may be dispersed into the plurality of sub light sensing areas 1221 spaced apart from one another.

In this way, the plurality of sub light sensing areas 1221 are spaced apart from one another to expand a detection range of the light sensing area 122 and also improve a detection accuracy of the light sensing area 122. In some embodiments, the number of the sub light sensing areas 1221 is four, and a ratio of an area of each sub light sensing area 1221 to that of the pixel array 12 may be 0.05. The plurality of sub light sensing areas 1221 may be distributed on an upper side, a lower side, a left side and a right side of the imaging area 124, respectively. Of course, the specific number and location of the sub light sensing areas 1221 are not limited to the discussion of the above embodiments.

Figure 6:
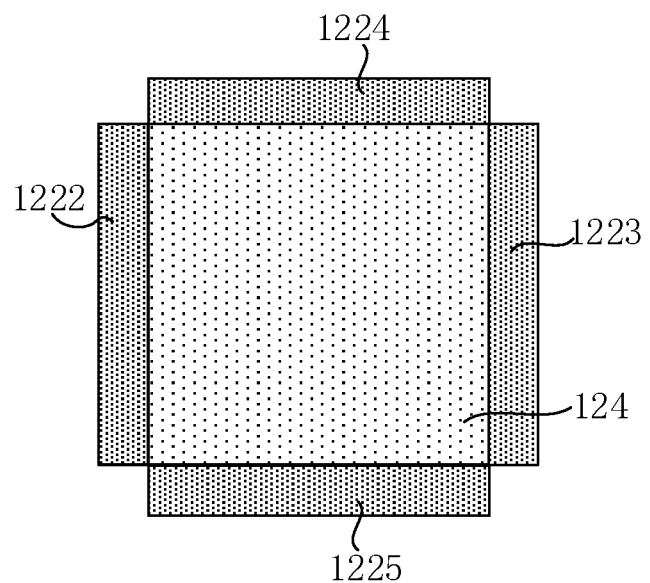
FIG. 6 is a plan view of a pixel array according to an embodiment of the present disclosure.

In some embodiments, as illustrated in FIG. 6, in some embodiments, the sub light sensing areas 1221 include a left light sensing area 1222 and a right light sensing area 1223. The left light sensing area 1222 is arranged on the left side of the imaging area 124, and the right light sensing area 1223 is arranged on the right side of the imaging area 124. The left light sensing area 1222 and the right light sensing area 1223 are arranged symmetrically. The left light sensing area 1222 detects a left illumination intensity, and the right light sensing area 1223 detects a right illumination intensity. The illumination intensity detected by the light sensing area 122 is an average value of the left illumination intensity and the right illumination intensity.

In this way, the left light sensing area 1222 and the right light sensing area 1223 have a substantially same influence on the final illumination intensity detected by the light sensing area 122, such that it is avoided that an inaccurate overall detection result is caused as the light sensing area 122 is too sensitive to a light change on the left side or the right side of the imaging area 124.

In some embodiments, the sub light sensing areas 1221 include an upper light sensing area 1224 and a lower light sensing area 1225. The upper light sensing area 1224 is arranged on the upper side of the imaging area 124, and the lower light sensing area 1225 is arranged on the lower side of the imaging area 124. The upper light sensing area 1224 and the lower light sensing area 1225 are arranged symmetrically. The upper light sensing area 1224 detects an upper illumination intensity, and the lower light sensing area 1225 detects a lower illumination intensity. The illumination intensity detected by the light sensing area 122 is an average value of the upper illumination intensity and the lower illumination intensity.

In this way, the upper light sensing area 1224 and the lower light sensing area 1225 have a substantially same influence on the final illumination intensity detected by the light sensing area 122, such that it is avoided that an inaccurate overall detection result is caused as the light sensing area 122 is too sensitive to a light change on the upper side or the lower side of the imaging area 124.

In some embodiments, the sub light sensing areas 1221 include the left light sensing area 1222, the right light sensing area 1223, the upper light sensing area 1224 and the lower light sensing area 1225 aforementioned. In some embodiments, the left light sensing area 1222, the right light sensing area 1223, the upper light sensing area 1224 and the lower light sensing area 1225 are distributed centrosymmetrically. The left light sensing area 1222 detects the left illumination intensity, and the right light sensing area 1223 detects the right illumination intensity. The upper light sensing area 1224 detects the upper illumination intensity, and the lower light sensing area 1225 detects the lower illumination intensity. The illumination intensity detected by the light sensing area 122 is an average value of the left illumination intensity, the right illumination intensity, the upper illumination intensity and the lower illumination intensity.

In this way, the left light sensing area 1222, the right light sensing area 1223, the upper light sensing area 1224 and the lower light sensing area 1225 have a substantially same influence on the final illumination intensity detected by the light sensing area 122, such that it is avoided that an inaccurate overall detection result is caused as the light sensing area 122 is too sensitive to a light change on the left side, the right side, the upper side or the lower side of the imaging area 124.

It should be noted that the above symmetrical distribution refers to symmetrical distributions of both area and shape with respect to the imaging area 124.

Figure 7:
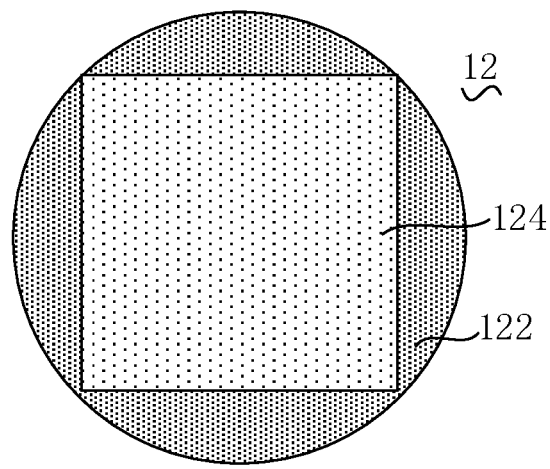
FIG. 7 is a plan view of a pixel array according to an embodiment of the present disclosure.
Figure 8:
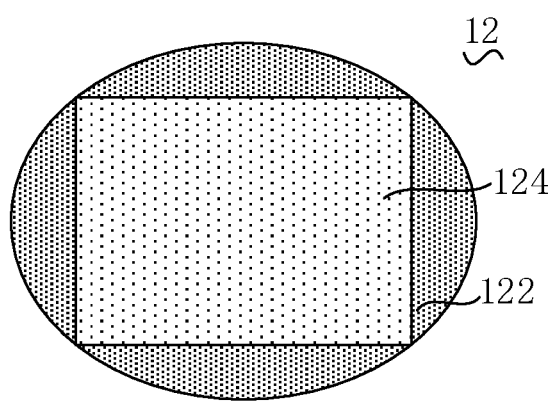
FIG. 8 is a plan view of a pixel array according to an embodiment of the present disclosure.

As also illustrated in FIGS. 7-8, in some embodiments, the pixel array 12 has a circular or elliptical shape. The imaging area 124 has a rectangular shape inscribed within the pixel array 12, and an area of the circular or elliptical pixel array 12 other than the inscribed rectangular imaging area 124 is the light sensing area 122.

In this way, the imaging area 124 is arranged in the center of the pixel array 12, so it is easy to obtain the image. The light sensing area 122 is arranged dispersively. The light sensing area 122 on the left side of the imaging area 124 and the light sensing area 122 on the right side of the imaging area 124 are symmetrical, such that the light sensing area 122 has the same sensitivity degree to the light changes on the left side and the right side of the imaging area 124. Moreover, the light sensing area 122 on the upper side of the imaging area 124 and the light sensing area 122 on the lower side of the imaging area 124 are symmetrical, such that the light sensing area 122 has the same sensitivity degree to the light changes on the upper side and the lower side of the imaging area 124. Thus, the detection result of the light sensing area 122 is accurate.

Figure 9:
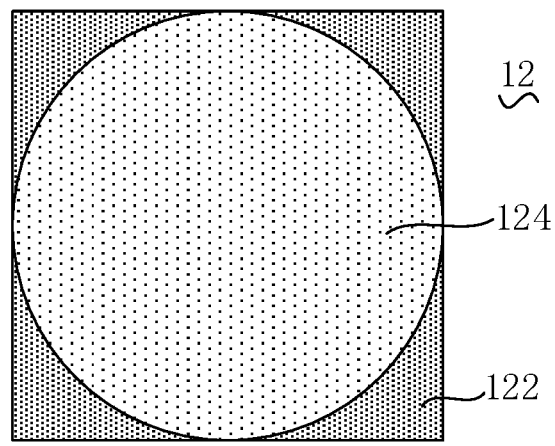
FIG. 9 is a plan view of a pixel array according to an embodiment of the present disclosure.
Figure 10:
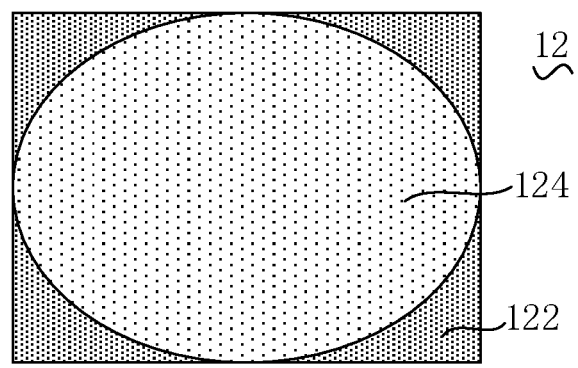
FIG. 10 is a plan view of a pixel array according to an embodiment of the present disclosure.

As also illustrated in FIGS. 9 and 10, the pixel array 12 has a rectangular shape. The imaging area 124 has a circular or elliptical shape inscribed within the rectangular pixel array 12, and an area of the rectangular pixel array 12 other than the inscribed circular or elliptical imaging area 124 is the light sensing area 122.

In this way, the shape of the imaging area 124 is circular or elliptical, such that the user can obtain a circular or elliptical image directly through the imaging area 124 without post-processing operations of the image, which meets the user's individualized requirement. Moreover, the light sensing area 122 is arranged dispersively, which improves the accuracy of the illumination intensity detected by the light sensing area 122.

In this way, the imaging area 124 is arranged in the center of the pixel array 12, so it is easy to obtain the image. Moreover, the light sensing area 122 on the upper side of the imaging area 124 and the light sensing area 122 on the lower side of the imaging area 124 are symmetrical, and the light sensing area 122 on the left side of the imaging area 124 and the light sensing area 122 on the right side of the imaging area 124 are symmetrical.

Figure 11:
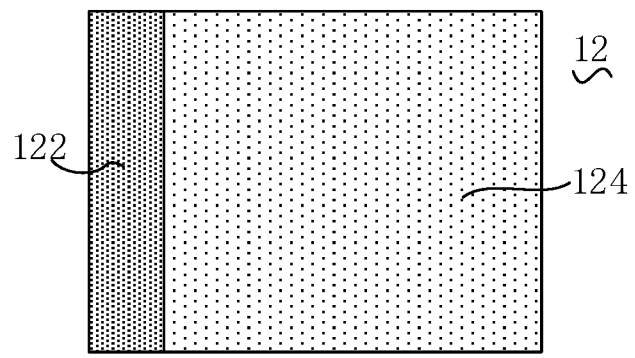
FIG. 11 is a plan view of a pixel array according to an embodiment of the present disclosure.
Figure 12:
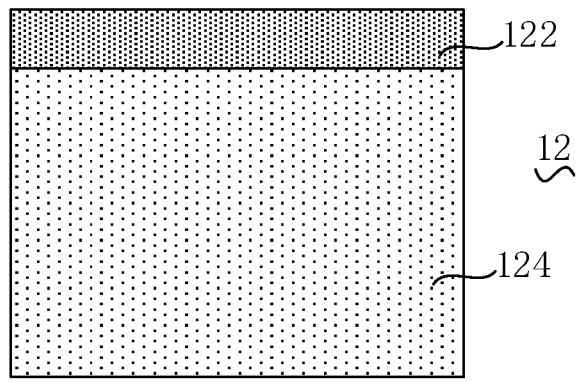
FIG. 12 is a plan view of a pixel array according to an embodiment of the present disclosure.

As also illustrated in FIGS. 11 and 12, in some embodiments, the imaging area 124 is continuously distributed, and the light sensing area 122 is also continuously distributed. The imaging area 124 and the light sensing area 122 are separated by a straight line. Thus, the structure of the pixel array 12 is simple, and the control circuit 20 can easily find the corresponding pixels in the imaging area 124 or the light sensing area 122 after receiving the first instruction or the second instruction. In some embodiment, the ratio of the area of the imaging area 124 to the area of the pixel array 12 is 0.8, and the ratio of the area of the light sensing area 122 to the area of the pixel array 12 is 0.2. The imaging area 124 may be rectangular so that the imaging area 124 can acquire a rectangular image, and the light sensing area 122 can also be rectangular. A long side of the light sensing area 122 may intersect with a long side of the imaging area 124, or the long side of the light sensing area 122 may intersect with a short side of the imaging area 124.

Reference throughout this specification to terms "an embodiment," "some embodiments," "an example", "a specific example," or "some examples," means that a particular feature, structure, material, or characteristic described in connection with the embodiment or example is included in at least one embodiment or example of the present disclosure. In this specification, example descriptions of aforesaid terms are not necessarily referring to the same embodiment or example. Moreover, the particular features, structures, materials, or characteristics described may be combined in any suitable manner in one or more embodiments or examples. Furthermore, in the case of non-contradiction, those skilled in the art may combine and group the different embodiments or examples described in this specification and the features of the different embodiments or examples.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means at least two, such as two, three and so on, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the implementations may not be in the order illustrated or discussed. For example, functions are performed in a substantially simultaneous manner or in a reverse order according to the functions involved, which should be understood by those skilled in the art of embodiments of the present disclosure.

The logic and/or step described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above example method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although embodiments of the present disclosure have been illustrated and described above, it should be understood that the above embodiments are illustrative and cannot be construed to limit the present disclosure, and that those skilled in the art may change, modify, alternate and vary the above embodiments within the scope of the present disclosure.

The invention claimed is:

1. An image sensor, comprising:
a pixel array comprising a light sensing area and an imaging area, the light sensing area being configured to detect an illumination intensity and the imaging area being configured to acquire an image; and
a control circuit coupled to the pixel array and configured to receive a first instruction to control the light sensing area to detect the illumination intensity, and to receive a second instruction to control the imaging area to acquire the image,
wherein the imaging area is inscribed within the pixel array, and an area of the pixel array other than the inscribed imaging area is the light sensing area,
wherein the pixel array has a rectangular shape, the imaging area has a circular or elliptical shape, and an area of the rectangular pixel array other than the inscribed circular or elliptical imaging area is the light sensing area.

2. The image sensor according to claim 1, wherein the imaging area is continuously distributed and arranged in a center of the pixel array, and the light sensing area is arranged at a periphery of the imaging area.

3. The image sensor according to claim 2, wherein the light sensing area comprises a plurality of sub light sensing areas, and the plurality of sub light sensing areas are equal in size and are spaced apart from one another.

4. The image sensor according to claim 1, wherein a ratio of an area of the imaging area to an area of the pixel array is greater than or equal to 0.6.

5. The image sensor according to claim 1, wherein the control circuit is configured to receive the first instruction and the second instruction at the same time.

6. The image sensor according to claim 1, wherein a ratio of an area of the light sensing area to an area of the pixel array is greater than or equal to 0.1.

7. The image sensor according to claim 1, wherein a ratio of an area of the imaging area to an area of the pixel array is greater than or equal to 0.6, and a ratio of an area of the light sensing area to an area of the pixel array is greater than or equal to 0.1.

8. A camera module, comprising:
an image sensor comprising:
a pixel array comprising a light sensing area configured to detect an illumination intensity and an imaging area configured to acquire an image; and
a control circuit connected to the pixel array and configured to control the light sensing area to detect the illumination intensity according to a first instruction, and to control the imaging area to acquire the image according to a second instruction; and an optical filter arranged opposite to the imaging area and configured to be passed through by light to allow the light to reach the imaging area, wherein the imaging area is inscribed within the pixel array, and an area of the pixel array other than the inscribed imaging area is the light sensing area, wherein the pixel array has a rectangular shape, the imaging area has a circular or elliptical shape, and an area of the rectangular pixel array other than the inscribed circular or elliptical imaging area is the light sensing area.

9. The camera module according to claim 8, further comprising a visible light filter arranged opposite to the light sensing area and configured to be passed through by a visible part of the light to allow the visible part of the light to reach the light sensing area.

10. The camera module according to claim 8, wherein the optical filter is a RGB filter.

11. An electronic device, comprising:
a camera module comprising:
an image sensor comprising:
a pixel array comprising a light sensing area configured to detect an illumination intensity and an imaging area configured to acquire an image; and
a control circuit connected to the pixel array and configured to control the light sensing area to detect the illumination intensity according to a first instruction, and to control the imaging area to acquire the image according to a second instruction; and
an optical filter arranged opposite to the imaging area and configured to be passed through by light to allow the light to reach the imaging area; and
a processor connected to the control circuit and configured to generate the first instruction and the second instruction,
wherein two camera modules are provided, one of the two camera modules is a front camera module arranged to a front face of the electronic device, and the other one of the two camera modules is a rear camera module arranged to a back face of the electronic device,
wherein the light sensing area of the front camera module is configured to detect the illumination intensity to obtain a front-face illumination intensity, the light sensing area of the rear camera module is configured to detect the illumination intensity to obtain a back-face illumination intensity, and the processor is configured to select a larger illumination intensity from the front-face illumination intensity and the back-face illumination intensity as a final illumination intensity.

12. The electronic device according to claim 11, wherein the processor is configured to generate and send the first instruction and the second instruction at the same time.

\* \* \* \* \*